No. 888,846. PATENTED MAY 26, 1908.
J. H. PHILLIPS, Jr.
PIPE OR HOSE COUPLING.
APPLICATION FILED JULY 26, 1907.

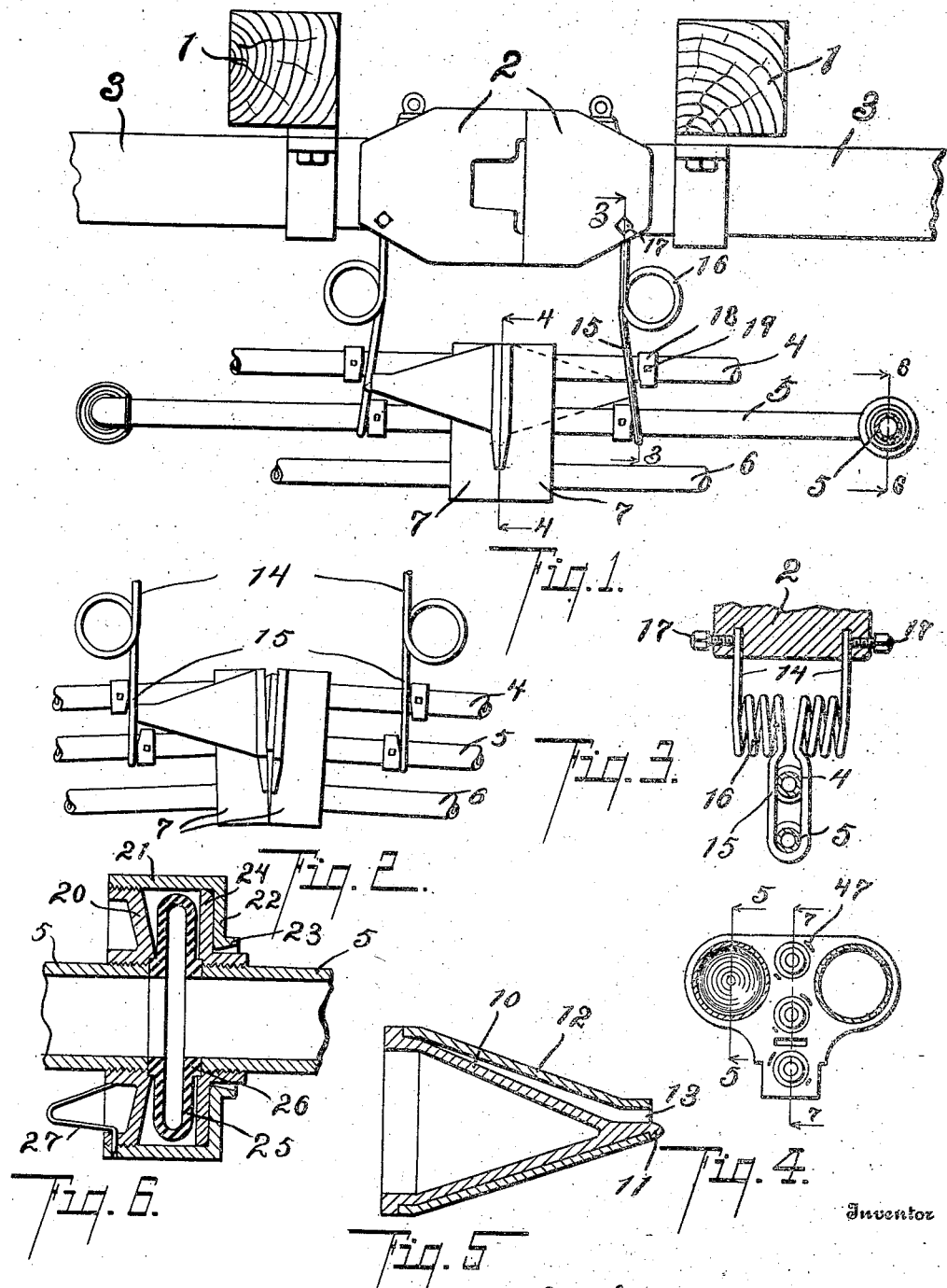

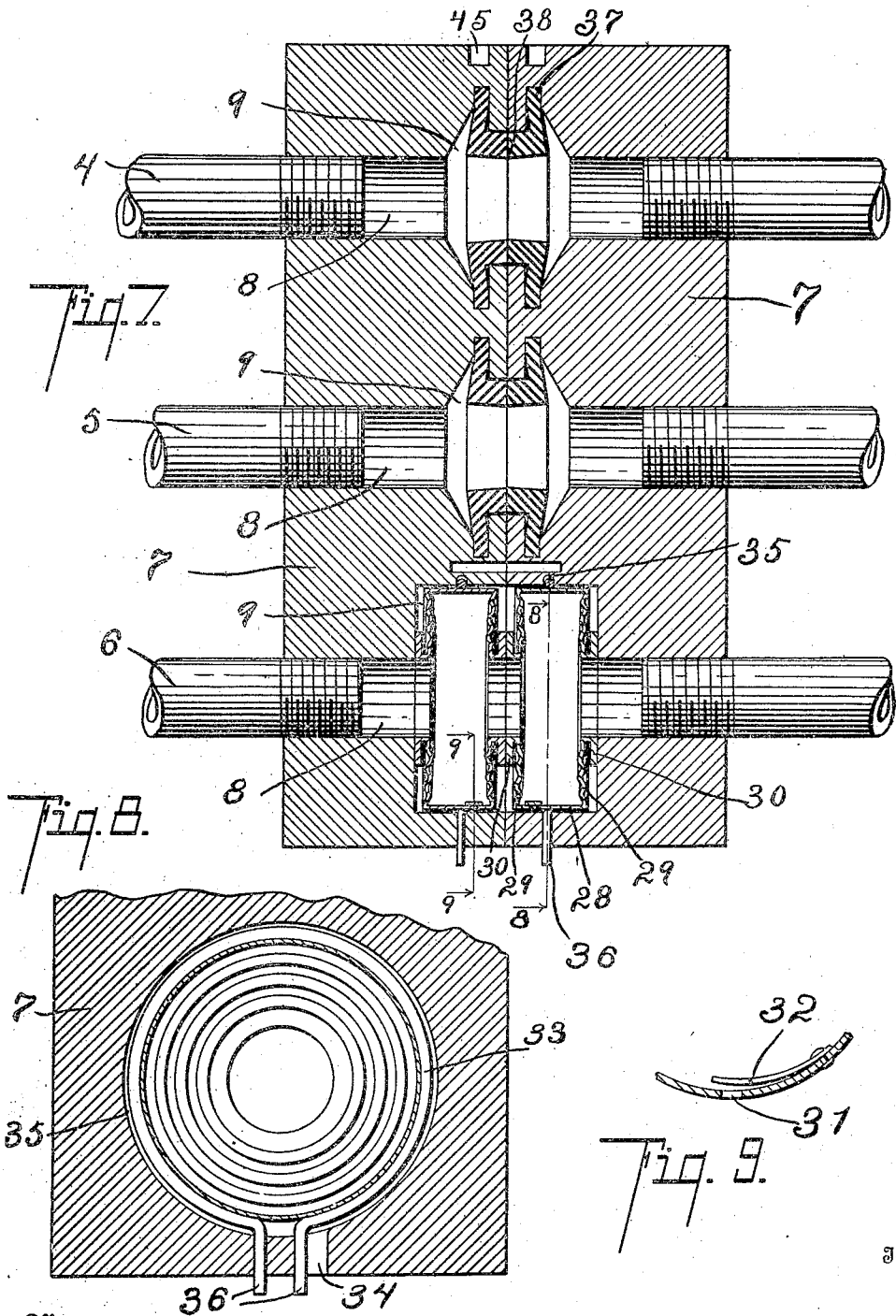

3 SHEETS—SHEET 3.

Inventor
John Henry Phillips Jr.

Witnesses
Lulu G. Greenfield
F. Gertrude Tallman

By Chappell Earl
Attorneys

UNITED STATES PATENT OFFICE.

JOHN HENRY PHILLIPS, JR., OF JACKSON, MICHIGAN.

PIPE OR HOSE COUPLING.

No. 888,846.　　　Specification of Letters Patent.　　　Patented May 26, 1908.

Application filed July 26, 1907. Serial No. 385,716.

*To all whom it may concern:*

Be it known that I, JOHN HENRY PHILLIPS, Jr., a citizen of the United States, residing at the city and county of Jackson, State of Michigan, have invented certain new and useful Improvements in Pipe or Hose Couplings, of which the following is a specification.

This invention relates to improvements in pipe or hose coupling.

My improved pipe or hose coupling is particularly adapted and, as shown in the accompanying drawing, is designed for use as a coupling for the steam and air pipes of railway trains, although it is applicable, and certain features thereof are desirable for use in various other relations.

The main objects of this invention are: First, to provide an improved coupling for pipes of railway trains which is adapted to automatically couple and uncouple all of the pipes of a train, both steam and air, upon the coupling and uncoupling of the cars; second, to provide an improved coupling for the pipes of railway trains, in which the use of rubber or like flexible hose is dispensed with; third, to provide an improved coupling for the pipes of railway trains in which a car having a combination coupling may be readily coupled or connected to a car equipped with individual coupling; fourth, to provide in a coupling an improved packing ring; and fifth, to provide an improved pipe or hose coupling which is very simple and economical in structure, very durable in use, and not likely to get out of repair.

Further objects, and objects relating to details of construction, will definitely appear from the detailed description to follow.

I accomplish the objects of my invention by the devices and means described in the following specification.

The invention is clearly defined and pointed out in the claims.

A structure embodying the features of my invention is clearly illustrated in the accompanying drawing, forming a part of this specification, in which:—

Figure 10:
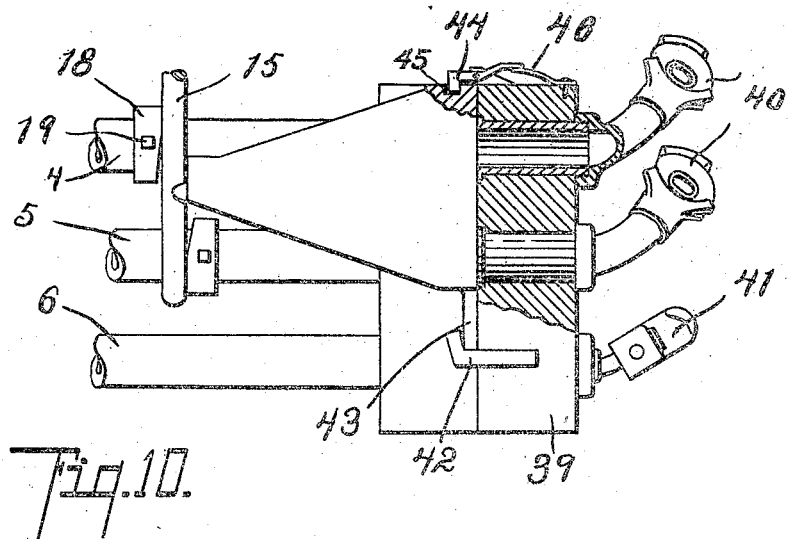
Figure 11:
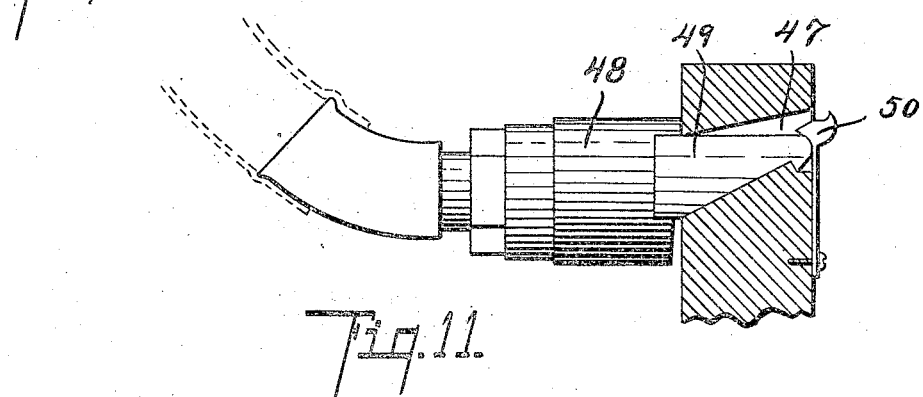
Figures 12, 13:
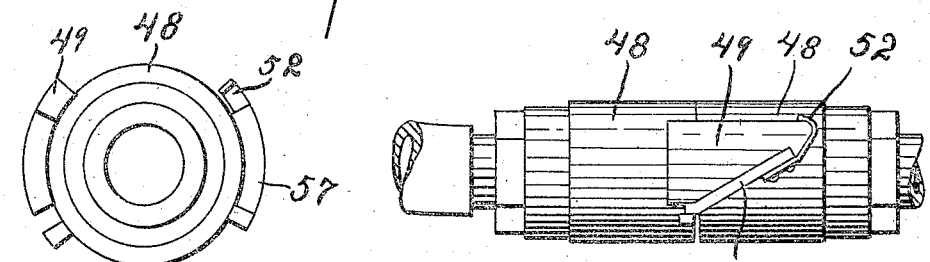

Figure 1 is a detail side elevation of a structure embodying the features of my invention, in its coupled relation; Fig. 2 is a detail side elevation showing the position the parts assume in uncoupling; Fig. 3 is a detail vertical cross section taken on a line corresponding to the broken line 3—3 of Fig. 1, the hanger being shown in full lines; Fig. 4 is a front elevation of one of the coupling members; Fig. 5 is an enlarged section taken on a line corresponding to line 5—5 of Fig. 4; Fig. 6 is an enlarged detail section taken on a line corresponding to line 6—6 of Fig. 1, showing the flexible joint for the train pipes; Fig. 7 is an enlarged vertical section through the coupler heads, taken on a line corresponding to line 7—7 of Fig. 4; Fig. 8 is an enlarged detail section through the packing ring 28; Fig. 9 is an enlarged detail of the packing ring, showing the drain thereof; Fig. 10 is a side elevation, partially in section of a modification, showing how I adapt my improved couplings for use in connection with the couplings now in general use; Fig. 11 is a detail, partially in vertical section, showing one of my individual coupler members 48 attached to one of the combination coupling heads; Fig. 12 is a side elevation of a pair of the individual coupler members united; and Fig. 13 is an end elevation of one of the individual coupler members.

In the drawings, similar reference characters refer to similar parts throughout the several views. The sectional views are taken looking in the direction of the little arrows at the ends of the section lines.

Referring to the drawings, 1—1 represents the end sills or frame pieces of a pair of railway cars, 2 the draw heads and 3 the draw bars thereof. The pipes 4, 5 and 6 are the air signal, air brake and steam pipe, respectively, of the cars. Each set of pipes is provided with a coupling member comprising a head 7, having a plurality of bores 8 therein, into which the pipes are preferably threaded and which terminate on the front faces of the heads in packing ring sockets or chambers. Each head is provided on one side with a forwardly-projecting conical latch 10 having a downturned hook 11 at its forward end and on the other side with a corresponding conical socket 12 which is open at its inner end, as at 13, to receive the hook 11 of the latch, thus forming catches therefor, as clearly appears in Fig. 5. These conical latches and sockets effectively guide the heads together so that the packing rings are automatically brought into proper relation when the heads are coupled and serve to retain the heads together when brought face to face. The latches are engaged and disengaged by a tilting movement. To secure this in an effective and simple manner, I preferably support the parts by means of the hangers 14, which are preferably U-shaped in form and are provided with loops 15 at their lower ends adapted to embrace a plurality of the pipes to be coupled at the rear of the head. See Fig. 3. These hangers are preferably formed of spring metal rods, and the spring coils 16 are preferably formed therein, the coils being located above the pipes. These hangers are supported from the draw heads preferably by tapping into the bottom of the same and securing by means of the set screws 17. The hangers are so arranged as to hold the heads normally in a tilted position, suitable collars as 18 being preferably provided to limit the movement on the pipes. These collars are adjustably secured on the pipes by means of the set screws 19.

When the coupling members are brought together, as in the coupling of a train, the latches and sockets engage, thus properly centering and guiding the heads together. The bottoms of the heads first engage, owing to their tilted position, and as they are brought together stress is put upon the hangers so that the heads are yieldingly held in coupled relation, so long as the cars remain coupled. When the cars are uncoupled, however, the tension on the hangers, which holds the heads together, is released, and owing to connection of the hangers to the heads, the heads are tilted, thereby automatically releasing the latches.

The pipes 4, 5 and 6 are preferably provided with my improved flexible joints or pipe couplings as illustrated in Figs. 1 and 6, the couplings being illustrated only in connection with the pipe 5. It will be understood that these are to be duplicated for the pipes 4 and 6. My improved flexible joint or coupling preferably consists of a socket member, comprising the flange 20 threaded upon one of the pipe sections on which the cap 21 is threaded, the cap 21 being provided with an inwardly-projecting flange 22 having a flaring mouth 23. The socket is thus easily formed and assembled. On the other pipe section is a flange-like swivel 24 adapted normally to rest against the flange 22 of the socket, as is illustrated in Fig. 6. It may, however, be rotated and tilted therein. A U-shaped packing ring as 25 is provided, the arms of the packing ring having thickened portions or bearing lips 26 adapted to engage the ends of the pipes. By this arrangement, when the pressure is on the pipe, the packing ring is held firmly in position, forming a very secure joint. The packing ring being formed of resilient material permits the movement of the coupling members on each other without its being displaced. I preferably provide a spring locking pin 27 adapted to engage the socket members 21 to prevent their becoming unthreaded.

The pipes 6 are provided with sleeve-like metal packing rings 28 having arms or flanges 29 at each end, which are preferably provided with ring-like bearings lip 30, the inner bearing lip being arranged to bear against the inner end of the packing ring sockets, forming a tight joint at that point, and the outer bearing lip being adapted to be engaged by the outer bearing lip of the packing ring of the opposite member. The arms or flanges of these packing rings are provided with annular corrugations so that they are quite elastic, and so that the bearing portions thereof are not thrown out of alinement when the packing rings are brought together under pressure.

The bearing lips and the flanges are preferably secured together at their inner edges only, as clearly appears from the drawing, which further assists in maintaining the bearing lips in complete contact. The packing rings are arranged so that the forward lips thereof normally project beyond the faces of the heads, so that they are brought together under tension when the heads are coupled and as soon as the steam or pressure is turned thereon it acts to hold them more tightly together.

The packing rings are preferably provided with vent or drain openings 31 in the lower part thereof and with spring valves 32 adapted to close these drain openings, the pressure of the steam serving to close the valves, the valve opening sufficiently as soon as the steam is off to allow the packing rings to drain, the position of the valve being somewhat exaggerated in Fig. 9 to clearly show its position.

The packing rings are sleeved into the heads and are held therein by means of the retaining rings 33, which are arranged in the annular grooves 35 provided therefor in the sockets. The heads are preferably provided with openings 34 adapted to register with the grooves, which openings not only serve as drain openings, but also to receive the finger pieces 36 on the retaining rings, so that the rings may be spread apart to release the packing ring. The coupling head may be provided with the packing rings 28 for all of its pipes, but I show the pipes 4 and 5 equipped with packing rings 37 formed of elastic material, such as rubber, the packing rings having forwardly-projecting bearing lips 38. The rubber packing rings may be utilized if desired in this relation, as they are not injured by the heat, as would be the case if used for the steam pipes 6.

In order that my improved coupling heads might be used in connection with the couplings now in common use, I provide what I designate as "emergency" heads 39, which are provided with coupling members 40 and 41 of the type now quite generally in use, to which the regular coupling members may be attached, the head 29 being adapted to be attached to one of my improved coupling members. This coupling head 39 is preferably provided with inwardly-projecting upturned hooks 42 adapted to be engaged under the projections 43 on the coupling heads 7. On the top of the coupling head 39 is a pivoted latch 44 adapted to engage the latch sockets 45 provided therefor in the head. See Fig. 10. The latch 44 is held in engagement by means of the spring 46. The heads 39 are provided with the forwardly-projecting latch members and sockets 10 and 12, adapted to coact with the corresponding latch members provided for the head 7, as described.

To further adapt my combination couplings for use in connection with my individual couplers as shown in Figs. 11, 12, and 13, I provide the same with sockets 47 adapted to receive the latches 49 on the individual coupling member 48. These sockets are arranged so that the individual couplers are held in proper relation. The latches are held in the coupling heads preferably by the spring catches 50. See Fig. 11.

In Fig. 12 I illustrate a pair of individual couplings 48, which are provided with catches 51 adapted to be engaged by the latches 49 when properly brought end to end. The catches 51 are provided with springs 52 adapted to engage over the ends of the latches, as clearly appears from the drawing, thus effectively retaining the parts together by permitting their being disengaged by a rocking movement thereof, in which the spring 52 yields, thereby releasing the latch.

By arranging the parts as I have illustrated and described, I secure a coupling which is adapted to be automatically engaged and disengaged on the coupling and uncoupling of the cars. The structure is simple and durable and not likely to get out of repair.

I have illustrated and described the same in detail in the form preferred by me on account of its structural simplicity and economy. I am, however, aware that it is capable of very great variation in structural details without departing from my invention, and I desire to be understood as claiming the same specifically, as illustrated, as well as broadly.

Having thus described my invention, what I claim as new and desire to secure by Letters Patent, is:

1. In a coupling for train pipes, the combination with a pair of draw heads, of a plurality of pipes to be coupled; a pair of coupling members, each member comprising a coupling head having a plurality of packing members arranged thereon in vertical series, mounted on said pipes; a forwardly-projecting conical latch member on one side of said head having a downturned hook at its outer end, a corresponding conical socket at the other side of said head, said socket being open at its inner end to receive the hook of the latch of the opposite coupling member; U shaped hangers arranged to engage a plurality of said pipes, the arms of said hangers being rigidly secured to said draw heads and having spring coils therein; and collars on the said pipes for limiting the movement of the same relative to said hangers, whereby said heads are held yieldingly together when the said draw heads are coupled and tilted rearwardly to disengage the latches thereof when the draw heads are separated.

2. In a coupling for train pipes, the combination with a pair of draw heads, of a plurality of pipes to be coupled; a pair of coupling members, each comprising a coupling head having a plurality of packing members arranged thereon in vertical series, mounted on said pipes; a forwardly projecting conical latch member on one side of said head, a corresponding conical socket at the other side of said head; U-shaped hangers arranged to engage a plurality of said pipes, the arms of said hangers being rigidly secured to said draw heads and having spring coils therein; and collars on the said pipes for limiting the movement of the same relative to said hangers, whereby said heads are held yieldingly together when the said draw heads are coupled, and tilted rearwardly to disengage the latches thereof when the draw heads are separated.

3. In a coupling for train pipes, the combination with a pair of draw heads, of a plurality of pipes to be coupled; a pair of coupling members, each comprising a coupling head having a plurality of packing members arranged thereon in vertical series, mounted on said pipes; a rigid latch member, and a catch for the latch of the opposite member, the said latches and catches therefor being adapted to be engaged and disengaged by a tilting movement of the heads; U-shaped hangers arranged to engage a plurality of said pipes, the arms of said hangers being rigidly secured to said draw heads and having spring coils therein; and collars on the said pipes for limiting the movement of the same relative to said hangers, whereby the said heads are held yieldingly together when the said draw heads are coupled or tilted rearwardly to disengage the latches thereof when the draw heads are separated.

4. In a coupling for train pipes, the combination with a pair of draw heads, of a plurality of pipes to be coupled; a pair of coupling members, each comprising a coupling head having a plurality of packing members arranged thereon in vertical series, mounted on said pipes; a forwardly-projecting conical latch member on one side of said head having a downturned hook at its outer end, a corresponding conical socket at the other side of said head, said socket being open at its inner end to receive the hook of the latch of the opposite coupling member; U-shaped spring hangers arranged to engage a plurality of said pipes, the arms of said hangers being rigidly secured to said draw heads; and collars on the said pipes for limiting the movement of the same relative to said hangers, whereby said heads are held yieldingly together when the said draw heads are coupled and tilted rearwardly to disengage the latches thereof when the draw heads are separated.

5. In a coupling for train pipes, the combination with a pair of draw heads, of a plurality of pipes to be coupled; a pair of coupling members, each comprising a coupling head having a plurality of packing members arranged thereon in vertical series, mounted on said pipes; a forwardly-projecting conical latch member on one side of said head, a corresponding conical socket at the other side of said head; U-shaped spring hangers arranged to engage a plurality of said pipes, the arms of said hangers being rigidly secured to said draw heads; and collars on the said pipes for limiting the movement of the same relative to said hangers, whereby said heads are held yieldingly together when the said draw heads are coupled and tilted rearwardly to disengage the latches thereof when the draw heads are separated.

6. In a coupling for train pipes, the combination with a pair of draw heads, of a plurality of pipes to be coupled; a pair of coupling members, each comprising a coupling head having a plurality of packing members arranged thereon in vertical series, mounted on said pipes; a rigid latch member and a catch for the latch of the opposite member, the said latches and catches therefor being adapted to be engaged and disengaged by a tilting movement of the heads; U-shaped spring hangers arranged to engage a plurality of said pipes, the arms of said hangers being rigidly secured to said draw heads; and collars on the said pipes for limiting the movement of the same relative to said hangers, whereby the said heads are held yieldingly together when the said draw heads are coupled and tilted rearwardly to disengage the latches thereof when the draw heads are separated.

7. In a coupling for train pipes, the combination with a pair of draw heads, of the pipes to be coupled; a pair of coupling members, each member comprising a coupling head, mounted on said pipes; a forwardly-projecting conical latch member on one side of said head, having a downturned hook at its outer end, a corresponding conical socket at the other side of said head, said socket being open at its inner end to receive the hook of the latch of the opposite coupling member; U-shaped spring hangers for said coupling members, the arms of said hangers being rigidly secured to said draw heads and having spring coils therein, said hangers being adapted to hold said heads yieldingly together when the said draw heads are coupled and to tilt them rearwardly to disengage the latches when the draw heads are separated.

8. In a coupling for train pipes, the combination with a pair of draw heads, of the pipes to be coupled; a pair of coupling members, each member comprising a coupling head, mounted on said pipes; a forwardly-projecting conical latch member on one side of said head, a corresponding conical socket at the other side of said head; U-shaped spring hangers for said coupling members, the arms of said hangers being rigidly secured to said draw heads and having spring coils therein, said hangers being adapted to hold said heads yieldingly together when the said draw heads are coupled and to tilt them rearwardly to disengage the latches when the draw heads are separated.

9. In a coupling for train pipes, the combination with a pair of draw heads, of the pipes to be coupled; a pair of coupling members, each member comprising a coupling head, mounted on said pipes; a rigid latch member, and a catch for the latch member of the opposite head, the said members being adapted to be engaged and disengaged by a tilting movement of the heads; and U-shaped spring hangers for said coupling members, the arms of said hangers being rigidly secured to said draw heads and having spring coils therein, said hangers being adapted to hold said heads yieldingly together when the said draw heads are coupled and to tilt them rearwardly to disengage the latches when the draw heads are separated.

10. In a coupling for train pipes, the combination with a pair of draw heads, of the pipes to be coupled; a pair of coupling members, each member comprising a coupling head, mounted on said pipes; a forwardly-projecting conical latch member on one side of said head having a downturned hook at its outer end, a corresponding conical socket at the other side of said head; said socket being open at its inner end to receive the hook of the latch of the opposite coupling member; and spring hangers for said coupling members, secured to said draw heads, said hangers being adapted to hold said heads yieldingly together when the said draw heads are coupled and to tilt them rearwardly to disengage the latches when the draw heads are separated.

11. In a coupling for train pipes, the combination with a pair of draw heads, of the pipes to be coupled; a pair of coupling members, each member comprising a coupling head, mounted on said pipes; a forwardly-projecting conical latch member on one side of said head, a corresponding conical socket at the other side of said head; spring hangers for said coupling members secured to said draw heads, said hangers being adapted to hold said heads yieldingly together when the said draw heads are coupled and to tilt them rearwardly to disengage the latches when the draw heads are separated.

12. In a coupling for train pipes, the combination with a pair of draw heads, of the pipes to be coupled; a pair of coupling members, each member comprising a coupling head, mounted on said pipes; a rigid latch member, and a catch for the latch member of the opposite head, the said members being adapted to be engaged and disengaged by a tilting movement of the heads; and spring hangers for said coupling members secured to said draw heads, said hangers being adapted to hold said heads yieldingly together when the said draw heads are coupled and to tilt them rearwardly to disengage the latches when the said draw heads are separated.

13. In a coupling, the combination with a pair of supports, of the pipes to be coupled; a pair of coupling members, each member comprising a coupling head, mounted on said pipes; a forwardly-projecting conical latch member on one side of said head having a downturned hook at its outer end, a corresponding conical socket at the other side of said head, said socket being open at its inner end to receive the hook of the latch of the opposite coupling member; and U-shaped spring hangers for said coupling members, the arms of said hangers being rigidly secured to said supports and having spring coils therein, said hangers being adapted to hold said heads yieldingly together when in coupled relation and to tilt them rearwardly to disengage the latches when they are separated.

14. In a coupling, the combination with a pair of supports, of the pipes to be coupled; a pair of coupling members, each member comprising a coupling head, mounted on said pipes; a forwardly-projecting conical latch member on one side of said head; a corresponding conical socket at the other side of said head; U-shaped spring hangers for said coupling members, the arms of said hangers being rigidly secured to said supports and having spring coils therein, said hangers being adapted to hold said heads yieldingly together when in coupled relation and to tilt them rearwardly to disengage the latches when they are separated.

15. In a coupling, the combination with a pair of supports, of the pipes to be coupled; a pair of coupling members, each member comprising a coupling head, mounted on said pipes; a rigid latch member, and a catch for the latch member of the opposite head, said members being adapted to be engaged and disengaged by a tilting movement of the heads; and U-shaped spring hangers for said coupling members, the arms of said hangers being rigidly secured to said supports and having spring coils therein, said hangers being adapted to hold said heads yieldingly together when in coupled relation and to tilt them rearwardly to disengage the latches when they are separated.

16. In a coupling, the combination with a pair of supports, of the pipes to be coupled; a pair of coupling members, each member comprising a coupling head, mounted on said pipes; a forwardly-projecting conical latch member on one side of said head having a downturned hook at its outer end, a corresponding conical socket at the other side of said head, said socket being open at its inner end to receive the hook of the latch of the opposite coupling member; spring hangers for said coupling members secured to said supports, said hangers being adapted to hold said heads yieldingly together when in coupled relation and to tilt them rearwardly to disengage the latches when they are separated.

17. In a coupling, the combination with a pair of supports, of the pipes to be coupled; a pair of coupling members, each member comprising a coupling head, mounted on said pipes; a forwardly-projecting conical latch member on one side of said head, a corresponding conical socket at the other side of said head; spring hangers for said coupling members, secured to said supports, said hangers being adapted to hold said heads yieldingly together when in coupled relation and to tilt them rearwardly to disengage the latches when they are separated.

18. In a coupling, the combination with a pair of supports, of the pipes to be coupled; a pair of coupling members; each member comprising a coupling head, mounted on said pipes; a rigid latch member, and a catch for the latch member of the opposite head, said members being adapted to be engaged and disengaged by a tilting movement of the heads; and spring hangers for said coupling members secured to said supports, said hangers being adapted to hold said heads yieldingly together when in coupled relation and to tilt them rearwardly to disengage the latches when they are separated.

19. In a structure of the class described, the combination with the pipe sections to be joined, of a cylinder-like socket or head having an inwardly-projecting flange at its outer end secured upon one of said pipe sections; an outwardly-projecting flange-like swivel secured upon the other of said pipe sections and arranged within said socket, said swivel having a tilting and rotary movement in said socket; and a packing ring arranged in said socket, said packing ring being U-shaped in cross section and formed of resilient material, and having bearing lips on its arms arranged to engage the ends of said pipe sections.

20. In a structure of the class described, the combination with the pipe sections to be joined, of a cylinder-like socket or head having an inwardly-projecting flange at its outer end secured upon one of said pipe sections; an outwardly-projecting flange-like swivel secured upon the other of said pipe sections and arranged within said socket, said swivel having a tilting and rotary movement in said socket; and a packing ring arranged in said socket, said packing ring being U-shaped in cross section and formed of resilient material.

21. In a structure of the class described, the combination of a coupling head having a cylinder-like packing ring socket; a U-shaped packing ring of spring metal sleeved into said socket, the said packing ring having a vent opening in the bottom thereof, the arms of said packing ring having annular corrugations therein; ring-like bearing lips for said packing ring, said bearing lips and the arms of said packing ring being secured together at their inner edges only; and a valve for said vent adapted to be closed by the pressure of the fluid within said packing ring, for the purpose specified.

22. In a structure of the class described, the combination of a coupling head having a cylinder-like packing ring socket; a U-shaped packing ring of spring metal sleeved into said socket, the arms of said packing ring having annular corrugations therein; and ring-like bearing lips for said packing ring, said bearing lips and the arms of said packing ring being secured together at their inner edges only, for the purpose specified.

23. In a structure of the class described, the combination of a coupling head having a cylinder-like packing ring socket; a U-shaped packing ring of spring metal sleeved into said socket, the arms of said packing ring having annular corrugations therein, and ring-like bearing lips for said packing ring, for the purpose specified.

24. In a structure of the class described, the combination of a coupling head having a cylinder-like packing ring socket; a U-shaped packing ring of spring metal sleeved into said socket, the said packing ring having a drain opening in the bottom thereof, the arms of said packing ring having annular corrugations therein, and a valve for said drain adapted to be closed by the pressure of the fluid within said packing ring, for the purpose specified.

25. In a structure of the class described, the combination of a coupling head having a cylinder-like packing ring socket; a U-shaped packing ring of spring metal sleeved into said socket, the arms of said packing ring having annular corrugations therein; and ring-like bearing lips for said packing ring, said bearing lips and the arms of said packing ring being secured together at their inner edges only for the purpose specified.

26. In a structure of the class described, the combination of a coupling head having a cylinder-like packing ring socket; a sleeve-like packing ring sleeved into said socket, the said packing ring having a vent opening in the under side thereof, and an inwardly-projecting flange at its outer end, said flange having annular corrugations therein; a ring-like bearing lip for said packing ring, said bearing lip and the flange of said packing ring being secured together at their inner edges only; and a valve for said vent adapted to be closed by the pressure of the fluid within said packing ring, for the purpose specified.

27. In a structure of the class described, the combination of a coupling head having a cylinder-like packing ring socket; a sleeve-like packing ring sleeved into said socket, the said packing ring having an inwardly-projecting flange at its outer end, said flange having annular corrugations therein; and a ring-like bearing lip for said packing ring, said bearing lip and the flange of said packing ring being secured together at their inner edges only, for the purpose specified.

28. In a structure of the class described, the combination of a coupling head having a cylinder-like packing ring socket; a sleeve-like packing ring sleeved into said socket, the said packing ring having a vent opening in the under side thereof, and an inwardly-projecting flange at its outer end, said flange having annular corrugations therein; and a valve for said vent adapted to be closed by the pressure of the fluid within said packing ring, for the purpose specified.

29. In a structure of the class described, the combination of a coupling head, having a cylinder-like packing ring socket; and a sleeve-like packing ring sleeved into said socket, the said packing ring having an inwardly-projecting flange at its outer end, said flange having annular corrugations therein, for the purpose specified.

30. In a structure of the class described, the combination of a coupling head having a cylinder-like packing ring socket, said socket having an annular groove in the wall thereof and openings through the bottom thereof, registering with said groove; a sleeve-like packing ring sleeved into said socket, and a ring-like retaining spring arranged in said groove in said packing ring socket to embrace said packing ring, said spring having outwardly-projecting finger-pieces thereon arranged through the opening in the bottom of said packing ring socket, for the purpose specified.

31. In a structure of the class described, the combination of a coupling head having a cylinder-like packing ring socket; a U-shaped packing ring of spring metal sleeved into said socket, the said packing ring having a drain opening in the bottom thereof, and a valve for said drain adapted to be closed by
5 the pressure of the fluid within said packing ring, for the purpose specified.

In witness whereof, I have hereunto set my hand and seal in the presence of two witnesses.

JOHN HENRY PHILLIPS, JR. [L. S.]

Witnesses:
 LACEME PATCH,
 WESLEY SEARS.